UNITED STATES PATENT OFFICE.

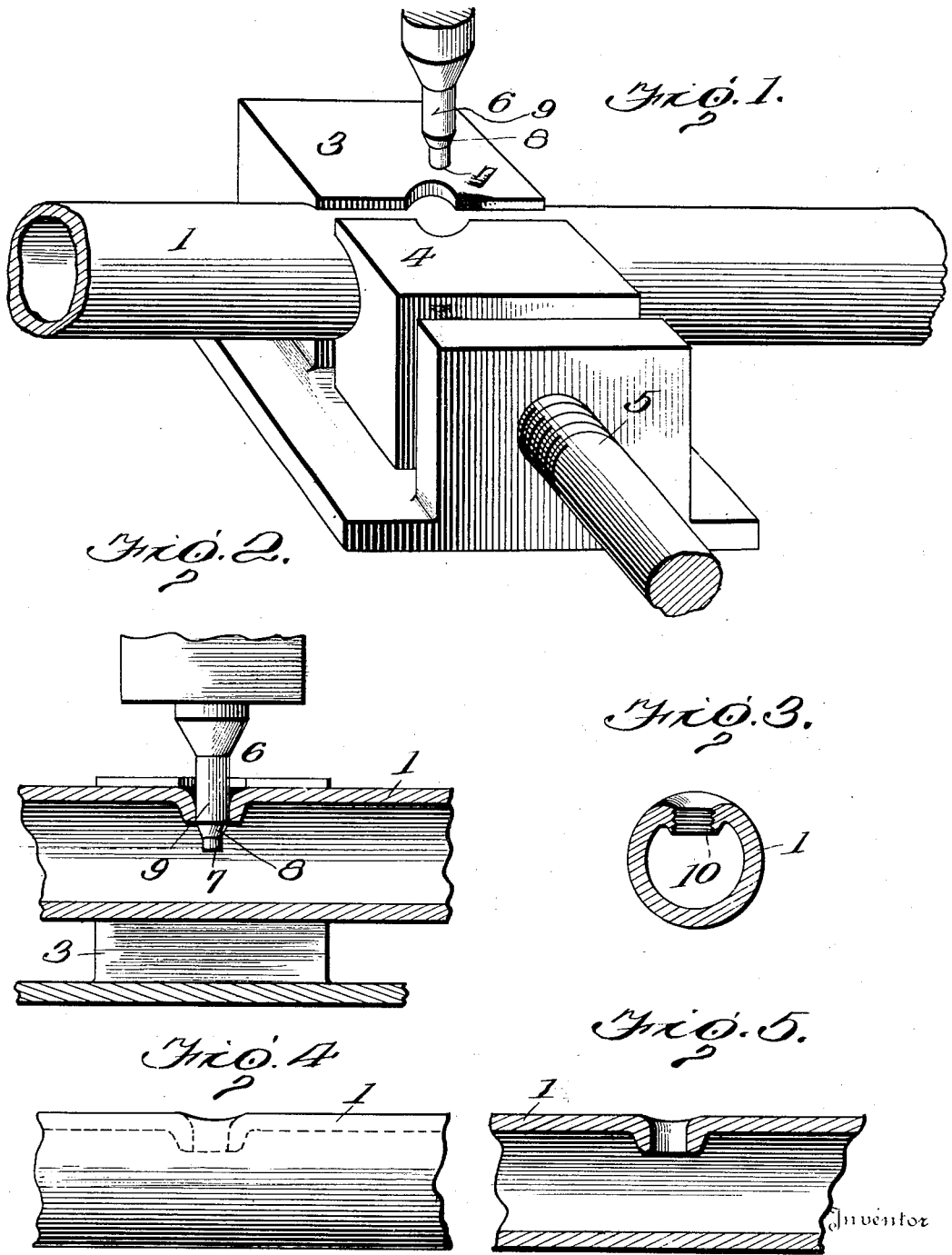

HERMAN PARPERT, OF ST. LOUIS, MISSOURI, ASSIGNOR TO AMERICAN STOVE COMPANY, OF ST. LOUIS, MISSOURI, A CORPORATION OF NEW JERSEY.

METHOD OF FORMING INTERNALLY-FLANGED TAPS FOR GAS-MANIFOLDS.

1,246,456.  Specification of Letters Patent.  Patented Nov. 13, 1917.

Application filed December 9, 1916. Serial No. 136,006.

*To all whom it may concern:*

Be it known that I, HERMAN PARPERT, a citizen of the United States, residing at St. Louis, State of Missouri, have invented certain new and useful Improvements in Methods of Forming Internally-Flanged Taps for Gas-Manifolds, of which the following is a specification, reference being had therein to the accompanying drawing.

My invention relates to improvements in the method of forming internally flanged taps for gas manifolds, and the object of which is to form an opening in the wall of the manifold and to flange the opening, whereby the flange will provide an internal surface of greater length or depth than the thickness of the wall of the manifold, to give an increased screw-threaded surface to enable a gas-tight joint to be made in the wall of the manifold.

Manufacturers of gas stoves have for years been troubled with the difficulty in making a screw-threaded gas-tight tap or connection with gas manifolds owing to the comparative thinness of the wall of the manifold and, therefore, there was not sufficient depth to the screw-threaded surface to enable a reliable gas-tight joint to be made.

My improvement consists in forming an opening in the wall of the manifold and simultaneously pushing in the wall of the opening to form an inwardly extending flange, and then cutting away and screw-threading a part of the thickness of the inner wall of the said flange, whereby a screw-threaded surface for the opening is provided, of a depth approximately twice the thickness of the wall of the manifold.

In the accompanying drawing—

Figure 1 is a perspective view showing a portion of the manifold, clamped in position to be punched and flanged.

Fig. 2 is a sectional view showing the act of punching and flanging inwardly the wall of the manifold.

Fig. 3 is a sectional view showing the manifold with the punched opening and the flange partially cut away and screw-threaded.

Fig. 4 is a view in side elevation, showing the flanged opening in dotted lines.

Fig. 5 is a sectional view showing the manifold with the flanged opening.

In carrying out my invention, a tube 1 out of which the manifold is to be constructed, is provided and is clamped between the jaws 3 and 4, one of the jaws being movable by means of a suitable screw 5, for the purpose of tightly clamping the tube 1. A punch 6 is provided. The lower end 7 of the punch is of the usual construction used to punch metal, and above this cutting or punching end 7, the punch 6 is tapered outward as at 8, and then has a straight portion 9 of a diameter approximately corresponding to the greater diameter of the tapered portion 8.

The tube 1 is held against being crushed or forced out of shape by the punching action, by reason of the clamping jaws 3 and 4. The punching end 7, therefore, punches an opening in the wall of the tube without disfiguring the tube, and in the further movement of the punch, the tapered portion 8 pushes the wall of the tube inward and forms an inwardly extending flange, and the straight portion 9 sets the flange to its expanded position.

In the tapping of the flanged opening, as shown in Fig. 3, a part of the wall of the flange of the opening is cut away thus making a screw-threaded surface of a depth approximately twice the thickness of the wall of the tube.

This method of punching and flanging openings is accomplished in one operation and as many openings may be made in the manifold or tube as desired, depending upon the length of the clamping jaws, or the number of clamping jaws and punches used, and they may all be operated simultaneously.

It will be observed that in the screw-threading or tapping of the opening, a part of the pushed in wall or flange is removed so that the inner end of the flange comes to a point as at 10. The screw-surface formed is of a depth considerably greater than the thickness of the wall of the tube, and provides sufficient screw-threaded surface to make a reliable gas-tight connection. This method overcomes the leaking joints in gas manifolds where the screw-threaded surface does not exceed the thickness of the wall of the manifold.

It will, of course, be understood that the tube is made of a material that can be punched and forced inwardly in the manner here described.

Having thus described my invention, what I claim and desire to secure by Letters Patent is—

1. The method of forming inwardly flanged openings in gas manifolds, consisting in approximately surrounding the tube with an external clamp, then punching an opening in the manifold at the clamped portion, pushing inward the wall of the periphery of the opening to form an inwardly extending flange and screw-threading the internal surface of the flange whereby a screw-threaded surface of greater depth than the thickness of the wall of the manifold is provided, for the purpose described.

2. The method of forming internally flanged screw-threaded openings in a gas stove manifold, consisting in approximately surrounding the manifold with a clamp, providing a punching tool with a punching end and an outwardly tapered portion thereabove and forcing the tool through the manifold first cutting the opening, and the tapered portion of the tool then pushing the peripheral wall of the opening forming an inwardly extending flange on the manifold, and then screw-threading the internal surface of the flange, forming a screw surface of greater depth than the thickness of the wall of the manifold.

In testimony whereof I hereunto affix my signature in the presence of two witnesses.

HERMAN PARPERT.

Witnesses:
 J. C. ELWANG,
 F. G. LANGBEIN.